United States Patent [19]

Friedman et al.

[11] Patent Number: 4,599,170
[45] Date of Patent: Jul. 8, 1986

[54] FILTRATION APPARATUS

[76] Inventors: Denis R. Friedman, 21 Arborwood Rd., Acton, Mass. 01720; Richard C. Goulston, Depot Rd., Harvard, Mass. 01451

[21] Appl. No.: 693,514

[22] Filed: Jan. 22, 1985

[51] Int. Cl.⁴ .............................................. B01D 35/06
[52] U.S. Cl. ................................ 210/223; 210/232; 210/244; 210/321.1; 210/413; 366/247
[58] Field of Search ............... 210/413, 414, 232, 236, 210/244, 407, 321.1, 433.2, 246, 223; 366/251, 247; 277/3, 201

[56] References Cited

U.S. PATENT DOCUMENTS

| | | | |
|---|---|---|---|
| 561,764 | 6/1896 | Clayton | 210/246 |
| 2,119,640 | 6/1938 | Lundell | 210/236 X |
| 2,185,897 | 1/1940 | Krause et al. | 210/244 |
| 3,055,208 | 9/1962 | Gallus | 210/413 X |
| 3,085,689 | 4/1963 | Hering et al. | 210/232 |
| 3,342,335 | 9/1967 | Gamundi et al. | 210/244 X |
| 3,480,145 | 11/1969 | Gladden | 210/223 |
| 3,486,622 | 12/1969 | Rosaen et al. | 210/223 X |
| 3,539,155 | 11/1970 | Agranat | 366/251 |
| 4,127,486 | 11/1978 | Hein et al. | 210/414 X |
| 4,399,042 | 8/1983 | Stannard et al. | 210/413 X |
| 4,406,786 | 9/1983 | Hein | 210/413 X |
| 4,416,775 | 11/1983 | Halbich et al. | 210/236 |

FOREIGN PATENT DOCUMENTS 689703 10/1979 U.S.S.R. ............... 210/413

Primary Examiner—Richard L. Chiesa

[57] ABSTRACT

A filter device including a unitary cell for receiving a fluid to be filtered and comprising a receptacle portion with an open end; a base portion defining an outlet and bonded to and closing an opposite end of the receptacle portion; and a filter membrane portion disposed between the open end and the outlet, the membrane portion being supported by the base portion and bonded between the base and receptacle portions. Also included are a cover removably engageable with the receptacle portion to close the open end; a seal disposed between the cover and the receptacle portion; a latch mechanism for producing a hermetic seal between the cover, the receptacle portion and the seal; an inlet providing for the receptacle portion an inlet for pressurized fluid; and a stirrer disposed within the receptacle portion and activatable to stir the fluid content thereof.

22 Claims, 6 Drawing Figures

FILTRATION APPARATUS

BACKGROUND OF THE INVENTION

This invention relates generally to filtration apparatus and, more particularly to a filtration device utilizing a disposable stirred cell.

Filtration of low to moderate (1 ml to 1 liter) volumes of fluids are frequently done using a family of devices known as stirred cells. These devices require the user to install a disc of filtration material in a base and secure the disc in place with an "O" ring or comparable sealing mechanism. The user must then further assemble this device onto a column used to hold and pressurize the liquid sample, place a magnetic stir bar and pressure head on top of the column, and then place the entire device within a pressure clamp or shell. In turn the device (or shell, depending on the particular design) must be secured to an apparatus known as a stir plate. This is usually done with adhesive or masking tape. A typical stirred cell is disclosed in U.S. Pat. No. 3,539,155.

The above described operating procedure involves several problems in addition to the aggravation of assembly. These problems include:

(1) Orientation and location of the filter disc is a problem. Several types of filters commonly used in stirred cells are assymetric, and proper orientation is a critical factor. Sealing characteristics of "O" rings are not always good and leaky assemblies are a frequent problem, necessitating rinsing, disassembly and reassembly.

(2) If the user wishes to retain the liquid in the device he must transfer it to another vessel, as there is no proper cap for the stir vessel. In addition, using the stir vessel to store liquids would tie up a valuable piece of apparatus.

(3) Securing the pressure shell to the stir plate is awkward. There is no proper provision for quick and simple location and removal.

(4) Once together it is not at all obvious what porosity membrane is assembled in the stirred cell.

The object of this invention, therefore, is to provide an improved, more efficient stirred cell filtration device.

SUMMARY OF THE INVENTION

The invention is a filter device including a unitary cell for receiving a fluid to be filtered and comprising a receptacle portion with an open end; a base portion defining an outlet and bonded to and closing an opposite end of the receptacle portion; and a filter membrane portion disposed between the open end and the outlet, the membrane portion being supported by the base portion and bonded between the base and receptacle portions. Also included are a cover removably engageable with the receptacle portion to close the open end; a seal disposed between the cover and the receptacle portion; a latch mechanism for producing a hermetic seal between the cover, the receptacle portion and the seal; an inlet providing for the receptacle portion an inlet for pressurized fluid; and a stirrer disposed within the receptacle portion and activatable to stir the fluid content thereof. By providing the membrane in a preassembled, pre-tested unitary cell, a technician need not worry about location, orientation or integrity of the membrane, which factors are dealt with during manufacture. Also, after use, a given cell can be disposed of and replaced by a fresh cell thereby eliminating time consuming cleaning requirements.

According to one feature of the invention, the latch mechanism establishes between the cover and the receptacle portion first and second closure positions, the first closure position preventing disengagement of the cover and the receptacle portion while providing a fluid communication path therebetween and the second closure position preventing disengagement between the cover and the receptacle portion while providing the hermetic seal. The first closure position allows release of residual pressure within the cell while preventing premature separation thereof from the cover.

According to other features of the invention, the latch mechanism comprises a plurality of circumferentially spaced apart ears on the receptacle portion and extending inwardly from the open end thereof, and a plurality of circumferentially spaced apart latches on an inner surface of the cover and extending inwardly therefrom; and each of the latches define first and second surfaces at different levels and joined by a ramp surface. During engagement of the cover and the receptacle portion and in response to relative axial movement therebetween the ears pass between the latches and in response to relative rotational movement between the cover and the receptacle portion the ears first engage the first surfaces in the first closure position and then move on the ramp surfaces and engage the second surfaces in the second closure position. This relatively simple structural arrangement provides reliably the desired two closure positions.

According to still other features of the invention, the inlet, the latches, and the cover are an integral unit; the seal is an O-ring; the cover comprises an inner side wall defining a groove that retains the O-ring, and the movement of the ears on the ramp surfaces produces between the cover and the receptacle portion relative axial movement that moves an outer surface of the receptacle portion into sealing engagement with the O-ring. This arrangement provides in a compact, efficient form structure for creating the desired hermetic seal between the cover and the receptacle portion.

According to another important feature of the invention, the device includes a coupling comprising fastening means for engaging the cell and securing means for detachably securing the coupling to a support surface. Preferably, the base portion comprises a shoulder extending outwardly from the receptacle portion and the fastening means comprises a pair of spaced apart parallel channels for receiving the shoulder to retain the cell. The coupling facilitates attachment and removal of the cell to and from the support surface.

According to yet other features of the invention, the base portion defines a planar surface for supporting the membrane portion and the planar surface defines a plurality of annular fluid communication paths surrounding the outlet and a plurality of radial fluid communication paths intersecting the annular paths and the outlet; and the annular and radial paths are separated by the membrane portion from the receptacle portion. The annular and radial paths facilitate removal of filtrate from the cell.

According to a further feature of the invention, the device includes an auxiliary cover for engaging the receptacle portion to close the open end thereof. The auxiliary cover permits a user to employ the cell as a storage vessel for retained liquid while allowing use to the cover and coupling components with another cell.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
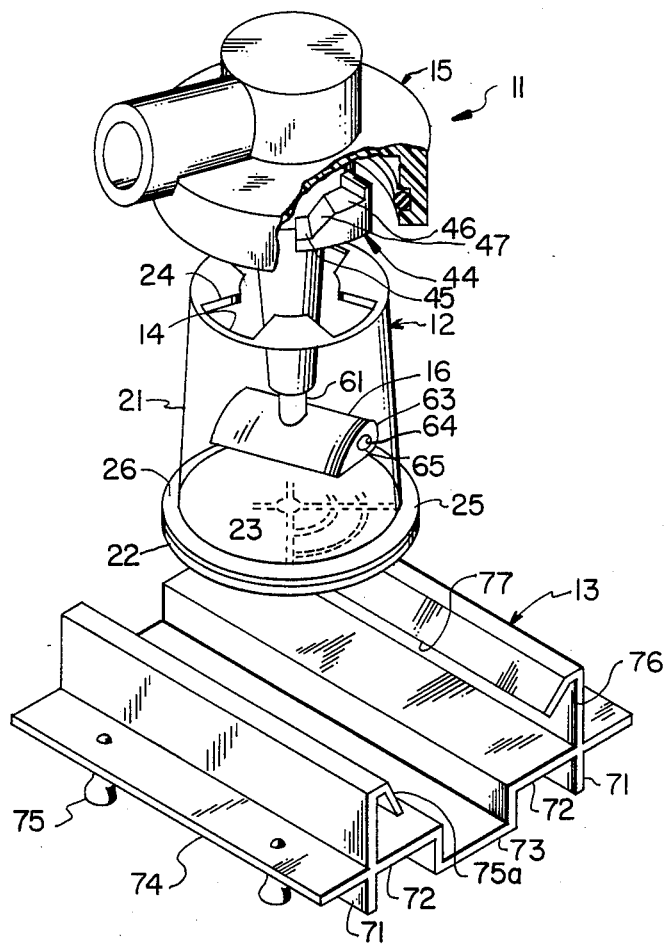
FIG. 1 is a schematic isometric view of the invention shown in a dismantled condition.

Referring to FIGS. 1-5 there is illustrated a filtration device 11 for use with a conventional magnetic stirrer (not shown) that employs a rotating magnet below a support surface. The device 11 includes a cell 12 for receiving a liquid to be filtered. A coupling member 13 supports the cell 12 and is adapted for positioning on the surface of the magnetic stirrer. An open end 14 of the cell 12 can be closed by a demountable cover member 15. Rotatably retained by the cover 15 and projecting into the cell 12 is a magnetic stirring element 16.

Included in the cell 12 is a hollow cylindrical receptacle portion 21, a base portion 22 and a filtration membrane 23. Three circumferentially spaced apart ears 24 project inwardly from the open end 14 of the receptacle portion 21. Extending outwardly from the opposite end of the receptacle portion 21 is a flange 25 that forms an annular shoulder 26. The base portion 22 includes a peripheral portion that engages the bottom surface of the flange 25 and a central portion that closes the lower end of the receptacle portion 21. Secured between the base portion 22 and the bottom surface of the flange 25 is the outer periphery of the membrane 23. The base portion 22 and the flange 25 are bonded together by a suitable bonding technique such as ultrasonic welding to provide the cell 12 as an integral, unitary structure.

Figure 2:
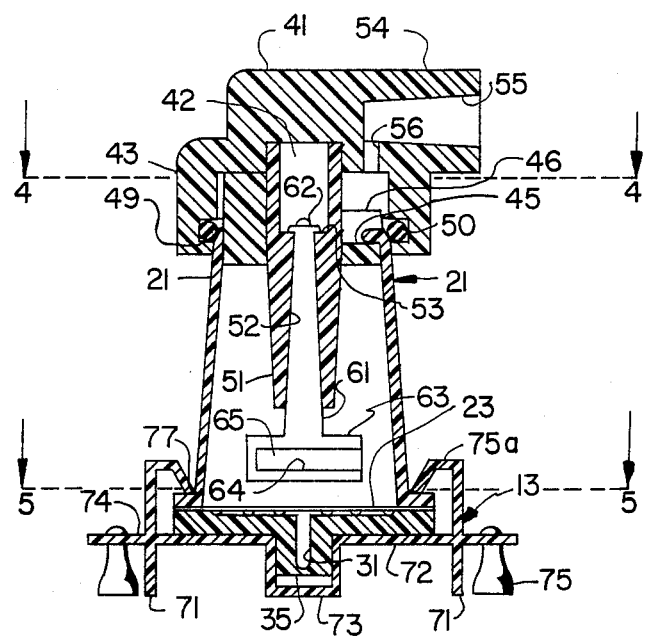
FIG. 2 is a schematic vertical cross-sectional view of the invention shown in a first assembled position.
Figure 5:
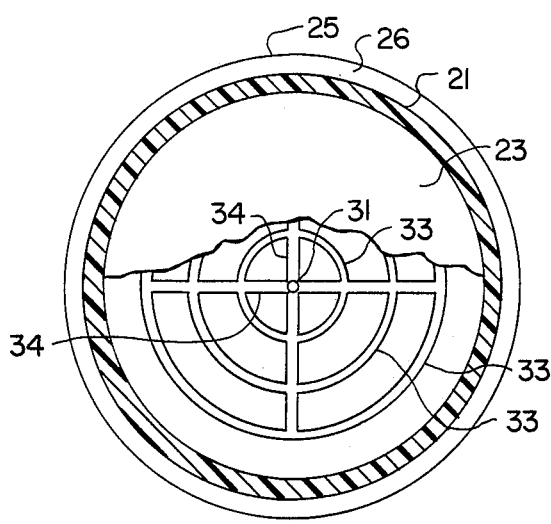
FIG. 5 is a schematic cross-sectional view taken along lines 5—5 of FIG. 2 and with the coupling 13 removed.

As shown in FIGS. 2 and 5, the central portion of the base portion 22 defines a central outlet opening 31 and has a planar top surface 32 that supports the membrane 23. Formed in the planar surface 32 are a plurality of radially spaced apart annular grooves 33 concentric with the outlet 31. Also formed in the planar surface 32 are a plurality of radially disposed grooves 34 that intersect both the annular grooves 33 and the outlet 31. The annular grooves 33 and the radial grooves 34 form fluid communication paths between the membrane 23 and the outlet 31. Bonded to the outlet 31 is an outlet fitting 35 for connection to suitable fluid handling tubing (not shown).

Figure 4:
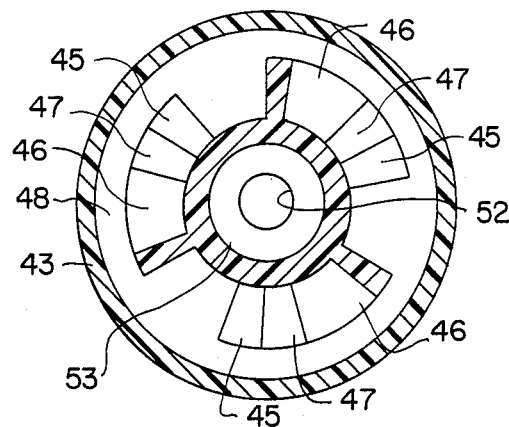
FIG. 4 is a schematic cross-sectional view taken along lines 4—4 of FIG. 2; and with the cell 12 removed.

The cover 15 includes a central body portion 41 that defines a central cavity 42 and an outwardly projecting skirt portion 43. Located between the skirt portion 43 and the body portion 41 and extending outwardly therefrom, are three circumferentially spaced apart latches 44. As shown in FIGS. 1 and 4, each of the latches 44 includes a first horizontal surface 45 and a relatively elevated second horizontal surface 46 joined by an inclined ramp surface 47. The outer surfaces of the latches 44 are separated from the inner surface of the skirt 43 by an annular recess 48.

Formed in an inner surface of the skirt 43 is an annular groove 49 that retains an O-ring 50. A column 51 extends downwardly from the body portion 41 and defines a central passage 52 that enters the cavity 42 to form therein an annular shoulder 53. Also defined by the cover 51 is a cylindrical inlet portion 54 that extends laterally from the body portion 41 and forms an inlet passage 55. Communicating with the inlet passage 55 is an inlet port 56 extending through the skirt portion 43. The inlet portion 54 of the cover 15 is adapted to accommodate conventional supply tubulation (not shown) for supplying pressurized air. Preferably, the central body portion 41, the latches 44 and the column 51 are individually molded pieces bonded together, for example by ultrasonic welding, to provide the cover 15 as an integral, unitary structure.

The stirring mechanism 16 includes a central shaft 61 that is accommodated by the central passage 52 in the column 51. Forming an upper end of the shaft 61 is a head portion 62 that is rotatably retained by the shoulder 53 in the cavity 42. A stirrer body portion 63 is formed at the lower end of the shaft 61 and defines a cylindrical cavity 64 that retains a permanent magnet 65.

The coupling member 13 includes a pair of legs 71 straddling and connected by horizontal webs 72 to a U-shaped channel portion 73. Extending outwardly from each of the webs 72 is a horizontal lip 74 that retains a pair of suction cups 75. An inwardly directed bracket portion 75a is disposed above each of the webs 72 and forms therewith an elongated channel 76. Opening into the channels 76 are facing slots 77. The bottom of the U-shaped channel 73 and the legs 71 are adapted to be positioned on a surface of a magnetic stirrer (not shown) and to be securely retained thereon by the suction cups 75.

Figure 3:
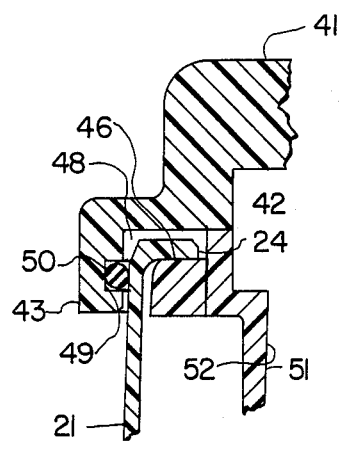
FIG. 3 is a schematic vertical cross-sectional view of the invention shown in a second assembled position.
Figure 6:
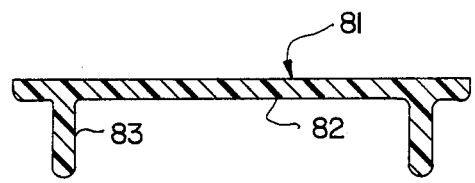
FIG. 6 is a schematic cross-sectional view of an additional component of the invention shown in FIGS. 1-5.

Referring now to FIG. 6 there is shown auxiliary cover 81 for the cell 12 shown in FIGS. 1-3. The auxiliary cover 81 includes a central portion 82 having an outer periphery joined with a skirt portion 83. After the skirt portion 83 of the auxiliary cover 81 is press fitted over the upper outer surface of the receptacle portion 21, the central portion 82 seals the open end 14 thereof.

OPERATION

During use of the device 11, the coupling element 13 is positioned on the surface of the conventional magnetic stirrer (not shown) and is securely retained thereon by the suction cups 75. A cell 12 of predetermined porosity then is selected from an inventory of such cells. After the receptacle portion 21 has been filled with a liquid to be filtered, cover 15 is positioned over the cell 12 and moved downwardly thereon to cover the open end 14 of the receptacle portion 21. This relative vertical movement between the cover 15 and the cell 12 is permitted by aligning the latches 44 with the passages between the ears 24 on the receptacle portion 26. The cap 15 then is rotated clockwise into a first closed position illustrated in FIG. 2. In that first position, the ears 24 engage the first latch surfaces 45 to thereby limit relative vertical movement between the cell 12 and the cover 15. However, as shown in FIG. 2, the outer surface of the receptacle portion 21 is not in sealing engagement with the O-ring 50. Thus, in the first closed position, the interior of the receptacle portion 21 is not hermetically sealed.

The cover 15 then is rotated farther in a clockwise direction to obtain the closed position shown in FIG. 3. In that position, the ears 24 engage the second engagement surfaces 46 of the latches 44 to again prevent relative axial movement between the cell 12 and the cover 15. During rotational movement of the cover 15 between the first and second closed positions, the ears 24 ride along the ramp portion surfaces 47 of the latches 44 to produce an axial closing motion between the cell 12 and the cover 15. That axial closure motion draws the receptacle portion 21 farther into the recess 48 to produce sealing engagement between the O-ring 50 and the receptacle portion 21 as shown in FIG. 3. Thus, in the second closed position, a hermetic seal is provided for the interior of the cell 12.

Once the cover 15 has been closed, the cell 12 is positioned in the coupling element 13. Positioning is easily accomplished by inserting the combined flange 25 and skirt 27 into the open ends of the channel 76. Once positioned, the base portion 28 of the cell 12 is supported by the webs 72 while upward movement of the cell 12 is restrained by engagement between the flange 25 and the brackets 75a.

After mounting of the cell 12, pressurized air is introduced through the inlet passage 55 and the inlet port 56 to provide air pressure above the liquid retained by the receptacle portion 21. That pressure forces a filtrate portion of the liquid through the membrane 23 into the communication passages 33, 34 in the base portion 22. The filtrate flows through the circular passages 33, the radial passages 34, and the outlet 31 into collection apparatus (not shown) connected to the fitting 35. Aiding the filtration process is the stirrer 16 which rotates within the receptacle portion 21 in response to a rotating magnetic field provided by a magnetic stirrer (not shown).

After completion of the filtration process, the cover 15 is removed from the cell 12 in two steps. In a first step, the cover 15 is rotated counter-clockwise from the second closed position shown in FIG. 3 to the first closed position shown in FIG. 2. This first step breaks the hermetic seal between the cover 15 and cell 12 to release fluid pressure within the receptacle portion 21. However, any undesirable, residual pressure induced discharge from the receptacle portion 21 is prevented by the cover 12 which is axially retained by engagement between the ears 24 and the first engagement surfaces 45 of the latches 44. In a second removal step, the cover 15 is rotated counter-clockwise to align the latches 44 with the openings between the ears 24. The cover 15 then can be completely removed from the cell 12. Removal of the cell 12 from the coupling element 13 is accomplished by sliding the combined flange 25 and skirt 27 horizontally out of the channels 76. After use, a given cell 12 can be discarded and a newly selected replacement cell used with the cover 15 and the coupling element 13. If the filter residue within the cell 12 is to be retained, the auxiliary cap 81 is placed over the receptacle portion 21 which then serves as a storage vessel.

Obviously, many modifications and variations of the present invention are possible in light of the above teachings. It is to be understood, therefore, that the invention can be practiced otherwise than as specifically described.

What is claimed is:

1. A filter apparatus comprising:
  a unitary cell for receiving a fluid to be filtered and comprising a receptacle portion with an open end; a base portion defining an outlet and inseparably bonded to and permanently closing an opposite end of said receptacle portion; and a filter membrane portion disposed between said open end and said outlet, said membrane portion being supported by said base portion and bonded between said base and receptable portions;
  cover means removably engagable with said receptacle portion to close said open end;
  seal means disposed between said cover means and said receptacle portion,
  latch means for producing a hermetic seal between said cover means, said receptacle portion and said seal means;
  inlet means providing for said receptacle portion an inlet for pressurized fluid; and
  stirrer means disposed within said receptacle portion and activatable to stir the fluid content thereof.

2. An apparatus according to claim 1 wherein said latch means establishes between said cover means and said receptacle portion first and second closure positions, said first closure position preventing both disengagement of said cell and said cover means and the creation by said seal means of a hermetic seal therebetween, and said second position preventing disengagement of said cell and said cover means and creating with said seal means a hermetic seal therebetween.

3. An apparatus according to claim 2 wherein said first closure position permits limited relative movement between said cell and said cover means in a direction required for complete disengagement thereof.

4. An apparatus according to claim 2 wherein said latch means comprises a plurality of circumferentially spaced apart ears on said receptacle portion and extending inwardly from said open end, and a plurality of circumferentially spaced apart latches on an inner surface of said cover means and extending inwardly therefrom, each of said latches defining first and second surfaces at different levels and joined by a ramp surface; and wherein during engagement of said cover means and said receptacle portion; and in response to relative axial movement therebetween said ears pass between said latches and in response to relative rotational movement between said cover means and said receptacle portion said ears first engage said first surfaces in said first closure position and then move on said ramp surfaces and engage said second surfaces in said second closure position.

5. An apparatus according to claim 4 wherein said inlet means, said latches, and said cover means are an integral unit.

6. An apparatus according to claim 5 wherein said seal means comprises an O-ring, said cover means comprises an inner side wall defining a groove that retains said O-ring, and said movement of said ears on said ramp surfaces produces between said cover means and said receptacle portion relative axial movement that moves an outer surface of said receptacle portion into sealing engagement with said O-ring.

7. An apparatus according to claim 6 wherein said receptacle portion is a hollow cylinder, said latches and said side wall define an annular recess, and a portion of said hollow cylinder enters said recess during said relative axial movement.

8. An apparatus according to claim 7 wherein said stirrer means comprises a magnet means rotatably supported by said cover means.

9. An apparatus according to claim 8 including a coupling means comprising fastening means for engaging said cell and securing means for detachably securing said coupling means to a support surface.

10. An apparatus according to claim 9 wherein said cell comprises a shoulder extending outwardly from said receptacle portion, and said fastening means comprises a pair of spaced apart parallel channels for receiving said shoulder to retain said cell.

11. An apparatus according to claim 10 wherein said securing means comprises suction cup means adapted to engage the support surface.

12. An apparatus according to claim 11 wherein said base portion defines a planar surface for supporting said membrane portion and said planar surface defines a plurality of fluid communication paths extending between said outlet and said membrane portion and being separated thereby from said receptacle portion.

13. An apparatus according to claim 12 wherein said communication paths comprise a plurality of annular paths surrounding said outlet and a plurality of radial paths intersecting said annular paths and said outlet.

14. An apparatus according to claim 1 including a coupling means comprising fastening means for engaging said cell and securing means for detachably securing said coupling means to a support surface.

15. An apparatus according to claim 14 wherein said latch means establishes between said cover means and said receptacle portion first and second closure positions, said first closure position preventing disengagement of said cover means and said receptacle portion while providing a fluid communication path therebetween and said second closure position preventing disengagement between said cover means and said receptacle means while providing said hermetic seal.

16. An apparatus according to claim 15 wherein said cell comprises a shoulder extending outwardly from said receptacle portion, and said fastening means comprises a pair of spaced apart parallel channels for receiving said shoulder to retain said cell.

17. An apparatus according to claim 16 wherein said latch means comprises a plurality of circumferentially spaced apart ears on said receptacle portion and extending inwardly from said open end, and a plurality of circumferentially spaced apart latches on an inner surface of said cover means and extending inwardly therefrom, each of said latches defining first and second surfaces at different levels and joined by a ramp surface; and wherein during engagement of said cover means and said receptacle portion and in response to relative axial movement therebetween said ears pass between said latches; and in response to relative rotational movement between said cover means and said receptacle portion said ears first engage said first surfaces in said first closure position and then move on said ramp surfaces and engage said second surfaces in said second closure position.

18. An apparatus according to claim 14 wherein said cell comprises a shoulder extending outwardly from said receptacle portion, and said fastening means comprises a pair of spaced apart parallel channels for receiving said shoulder to retain said cell.

19. An apparatus according to claim 18 wherein said securing means comprises suction cup means adapted to engage the support surface.

20. An apparatus according to claim 19 wherein said base portion defines a planar surface for supporting said membrane portion and said planar surface defines a plurality of fluid communication paths extending between said outlet and said membrane means and being separated thereby from said receptacle means.

21. An apparatus according to claim 20 wherein said communication paths comprise a plurality of annular paths surrounding said outlet and a plurality of radial paths intersecting said annular paths and said outlet.

22. An apparatus according to claim 1 including an auxiliary cover for engaging said receptacle portion to cover said open end thereof after removal of said cover means from said receptacle portion.

* * * * *